US007062640B2

(12) United States Patent
Jourdan et al.

(10) Patent No.: US 7,062,640 B2
(45) Date of Patent: Jun. 13, 2006

(54) INSTRUCTION SEGMENT FILTERING SCHEME

(75) Inventors: Stephan J. Jourdan, Portland, OR (US); Alan Miller, Portland, OR (US); Glenn Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 949 days.

(21) Appl. No.: 09/735,899

(22) Filed: Dec. 14, 2000

(65) Prior Publication Data

US 2002/0078327 A1 Jun. 20, 2002

(51) Int. Cl.
*G06F 9/30* (2006.01)

(52) U.S. Cl. ....................... 712/238; 712/206
(58) Field of Classification Search ................. 712/216, 712/219, 238, 237, 206, 215
See application file for complete search history.

(56) References Cited

U.S. PATENT DOCUMENTS

| 5,381,533 | A | * | 1/1995 | Peleg et al. ................. 712/215 |
| 5,913,223 | A |   | 6/1999 | Sheppard et al. |
| 6,185,675 | B1 | * | 2/2001 | Kranich et al. ............. 712/238 |
| 6,339,822 | B1 | * | 1/2002 | Miller ........................ 712/213 |
| 6,427,188 | B1 |   | 7/2002 | Lyon et al. |
| 6,535,959 | B1 |   | 3/2003 | Ramprasad et al. |

OTHER PUBLICATIONS

Black et al., The Block–based Trace Cache, Proceedings of the International Symposium on Computer Architecture, May 2–4, 1999, pp. 196–207.*
Patterson and Hennessy, Computer Organization and Design, 2nd Ed., 1998, p. 570.*

Rotenbery et al, Trace Processors, Proceedings of 30th Annual IEEE/ACM International Symposium on Microarchitecture, Dec. 1, 1997, p. 138–148.*
Jourdan et al, "eXtended Block Cache", Proceedings of Int'l . Symposium on High Performance Computer Architecture, pp. 1–10, Jan. 2000.
Solomon et al, "Micro–Operation Cache: A Power Aware Frontend for Variable Instruction Length ISA", ISLPED '01 Aug. 6–7, 2001.
Bellas et al, "Architectural and Compiler Techniques for Energy Reduction in High Performance Microprocessors", IEEE Transactions on VLSI, vol. 8, No. 3, Jun. 2000.
Friendly et al, "Alternative Fetch and Issue Policies for the Trace Cache Fetch Mechanism", 30th Annual IEEE/ACM Intl. Symposium on Microarchitecture, Research Triangle Park, North Carolina, Dec. 1–3, 1997.
Intrater et al, "Performance Evaluation of a Decoded Instruction Cache for Variable Instruction–Length Computers", 19th Annual Intl. Symposium on Computer Architecture, Gold Coast, Australia, May 19–21, 1992.
Jacobson et al, "Path–Based Next Trace Prediction", 30th Annual IEEE/ACM Intl. Symposium on Microarchitecture, Research Triangle Park, North Carolina, Dec. 1–3, 1997.

(Continued)

*Primary Examiner*—Eddie Chan
*Assistant Examiner*—Aimee J. Li
(74) *Attorney, Agent, or Firm*—Kenyon & Kenyon

(57) ABSTRACT

A filtering system for instruction segments determines whether a new instruction segment satisfies a predetermined filtering condition prior to storage. If the instruction segment fails the filtering condition, the new instruction segment is not stored. Various filtering conditions are available; but all filtering conditions test to determine whether it is more likely than not that a new instruction segment will be reused by the execution unit in the future.

37 Claims, 3 Drawing Sheets

OTHER PUBLICATIONS

Manne et al, "Pipeline Gating: Speculation Control for Energy Reduction", Proceedings, 25th Annual Intl. Symposium on Computer Architecture, IEEE Computer Society Tech. Comm. on Computer Architecture, ACM SIGARCH, Barcelona, Spain, Jun. 27–Jul. 1, 1998.

Glaskowsky, Peter N., "Pentlum 4 (Partially) Previewed", *Microprocessor Report*, vol. 14, Archive 8, pp. 11–13, Aug. 2000.

Papworth, David B., "Tuning the Pentium Pro Microarchitecture", *IEEE Micro*, IEEE Computer Society, vol. 16, No. 2, Apr. 1996.

Upton, Michael, "The Intel Pentium® 4 Processor", http://www.intel.com/pentium4, Oct. 2000.

Rotenberg et al, "Trace Cache: A Low Latency Approach to High Bandwith Instruction Fetching", Proceedings, 29th Annual IEEE/ACM Intl. Symposium on Microarchitecture, MICRO–29, IEEE Computer Society Tech. Comm. on Microprogramming and Microarchitecture, Assn. for Computing Machinery SIGMICRO, Paris, France, Dec. 2–4 1996.

* cited by examiner

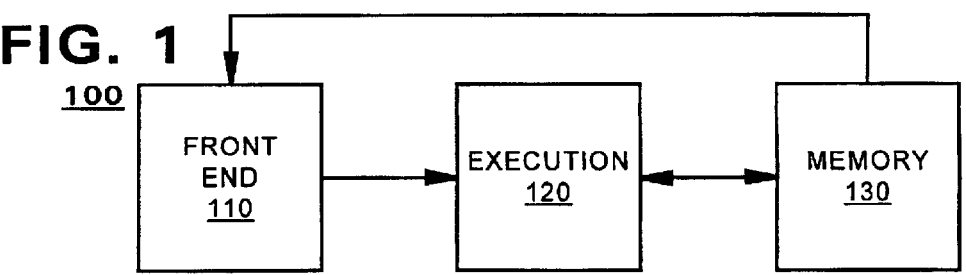
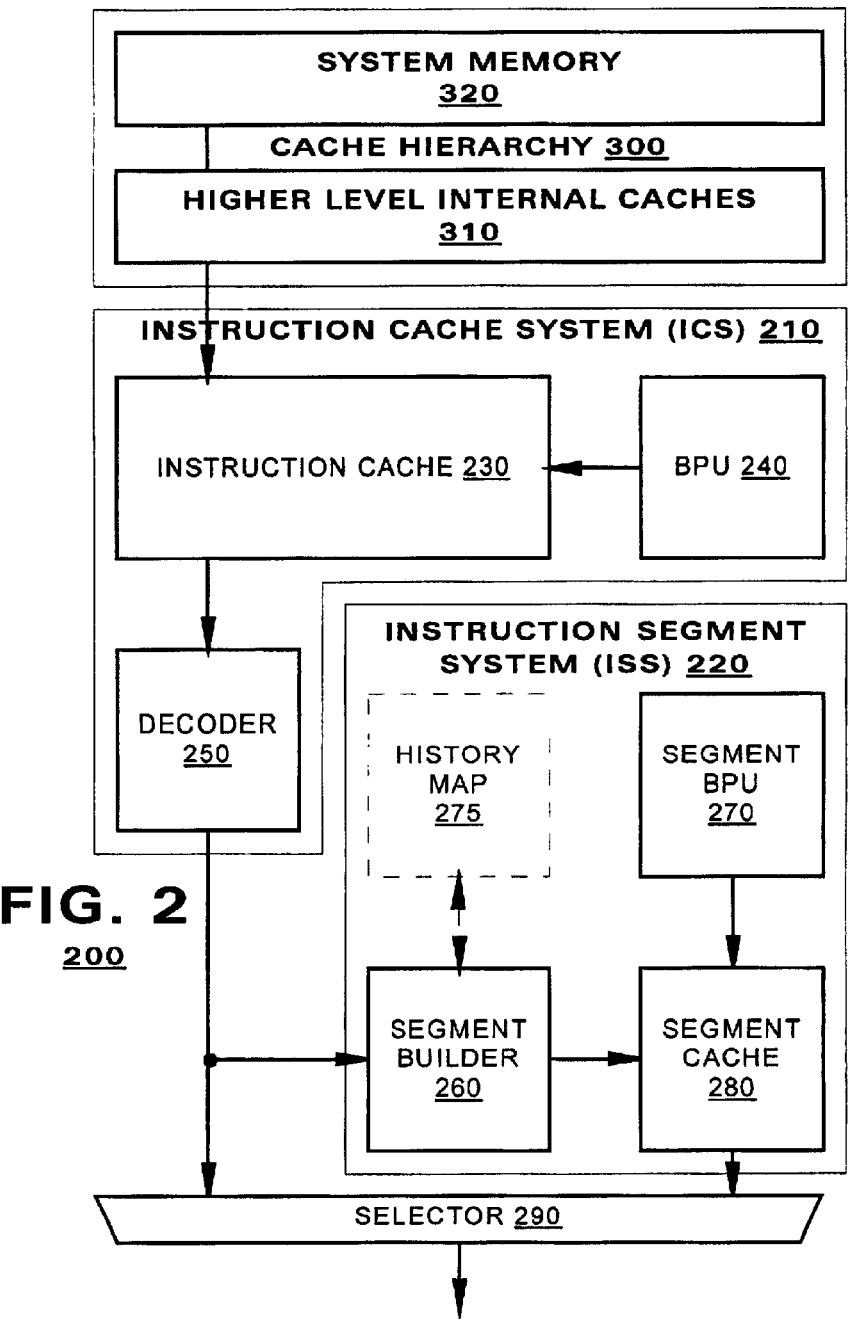

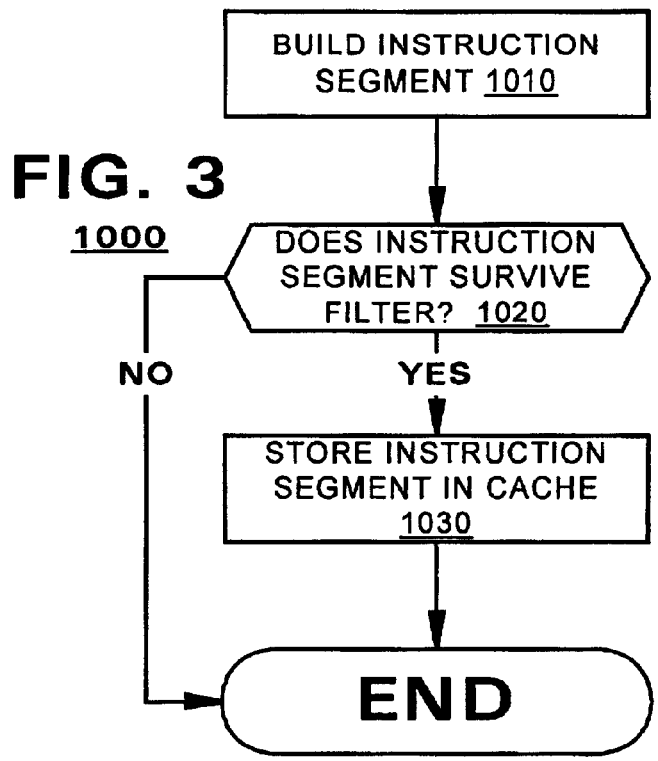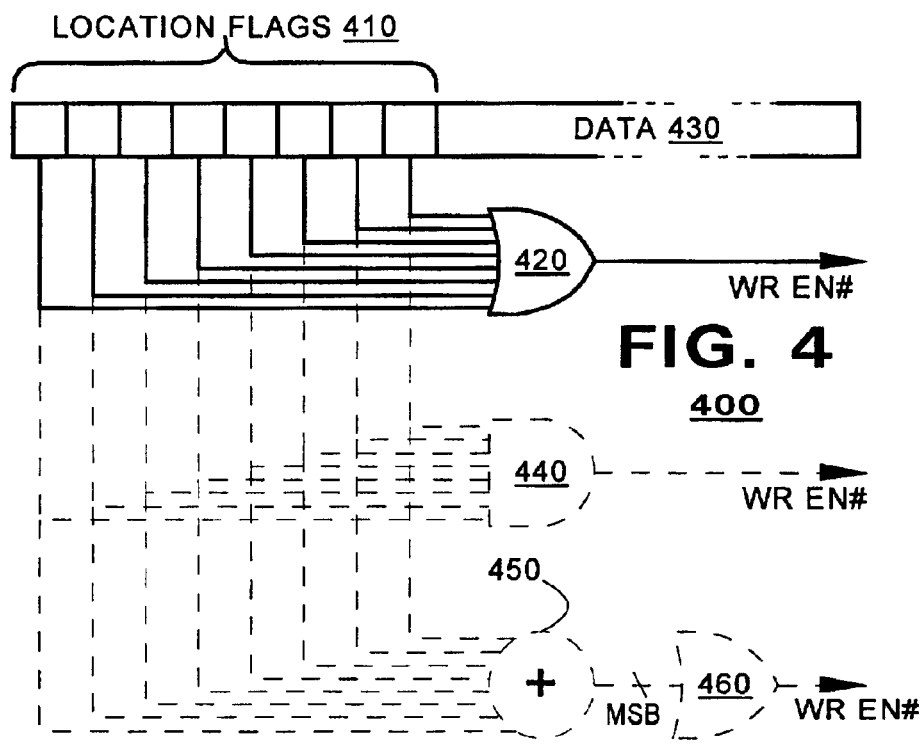

INSTRUCTION SEGMENT FILTERING SCHEME

BACKGROUND

The present invention relates to a filtering scheme for a processor front end in which only select instruction segments may be stored for later use.

FIG. 1 is a block diagram illustrating the process of program execution in a conventional processor. Program execution may include three stages: front end 110, execution 120 and memory 130. The front-end stage 110 performs instruction pre-processing. Front end processing 110 is designed with the goal of supplying valid decoded instructions to an execution core with low latency and high bandwidth. Front-end processing 110 can include branch prediction, decoding and renaming. As the name implies, the execution stage 120 performs instruction execution. The execution stage 120 typically communicates with a memory 130 to operate upon data stored therein.

Conventionally, front end processing 110 may build instruction segments from stored program instructions to reduce the latency of instruction decoding and to increase front-end bandwidth. Instruction segments are sequences of dynamically executed instructions that are assembled into logical units. The program instructions may have been assembled into the instruction segment from non-contiguous regions of an external memory space but, when they are assembled in the instruction segment, the instructions appear in program order. The instruction segment may include instructions or uops (microinstructions).

A trace is perhaps the most common type of instruction segment. Typically, a trace may begin with an instruction of any type. Traces have a single entry, multiple exit architecture. Instruction flow starts at the first instruction but may exit the trace at multiple points, depending on predictions made at branch instructions embedded within the trace. The trace may end when one of number of predetermined end conditions occurs, such as a trace size limit, the occurrence of a maximum number of conditional branches or the occurrence of an indirect branch or a return instruction. Traces typically are indexed by the address of the first instruction therein.

Other instruction segments are known. The inventors have proposed an instruction segment, which they call an "extended block," that has a different architecture than the trace. The extended block has a multiple-entry, single-exit architecture. Instruction flow may start at any point within an extended block but, when it enters the extended block, instruction flow must progress to a terminal instruction in the extended block. The extended block may terminate on a conditional branch, a return instruction or a size limit. The extended block may be indexed by the address of the last instruction therein. The extended block and methods for constructing them are described in the inventors' co-pending patent application Ser. No. 09/608,624, entitled "Trace Indexing by Trace End Address," filed Jun. 30, 2000.

A "basic block" is another example of an instruction segment. It is perhaps the most simple type of instruction segment available. The basic block may terminate on the occurrence of any kind of branch instruction including an unconditional branch. The basic block may be characterized by a single-entry, single-exit architecture. Typically, the basic block is indexed by the address of the first instruction therein.

Regardless of the type of instruction segment used in a processor 110, the instruction segment typically is stored in a cache for later use. Reduced latency is achieved when program flow returns to the instruction segment because the instruction segment may store instructions already assembled in program order. The instructions in the cached instruction segment may be furnished to the execution stage 120 faster than they could be furnished from different locations in an ordinary instruction cache.

Many instruction segments, once built and stored within a cache, are never used. This may occur, for example, because program flow does not return to the instructions that were placed in the instruction segment. Some other instruction segments may be reused quite often. However, because a segment cache may have a limited capacity (say, 12K instructions), low segment reuse causes even frequently-used instruction segments to be overwritten by other instruction segments before their useful life otherwise might conclude. Thus, with a high eviction rate, the advantages of instruction segments can be lost. Currently, there is no known caching scheme for instruction segments that distinguishes between highly used instruction segments and infrequently used instruction segments in a segment cache.

Accordingly, there is a need in the art for a filtering scheme in segment caches that store only highly used instruction segments for later use.

BRIEF DESCRIPTION OF THE DRAWINGS

FIG. 1 is a block diagram illustrating the process of program execution in a conventional processor.

FIG. 2 is a block diagram of a front end processing system according to an embodiment of the present invention.

FIG. 3 illustrates a basic method of operation 1000 for use with each of the filter conditions.

FIG. 4 illustrates circuitry for use in a segment builder according to an embodiment of the present invention.

DETAILED DESCRIPTION

Figure 5:
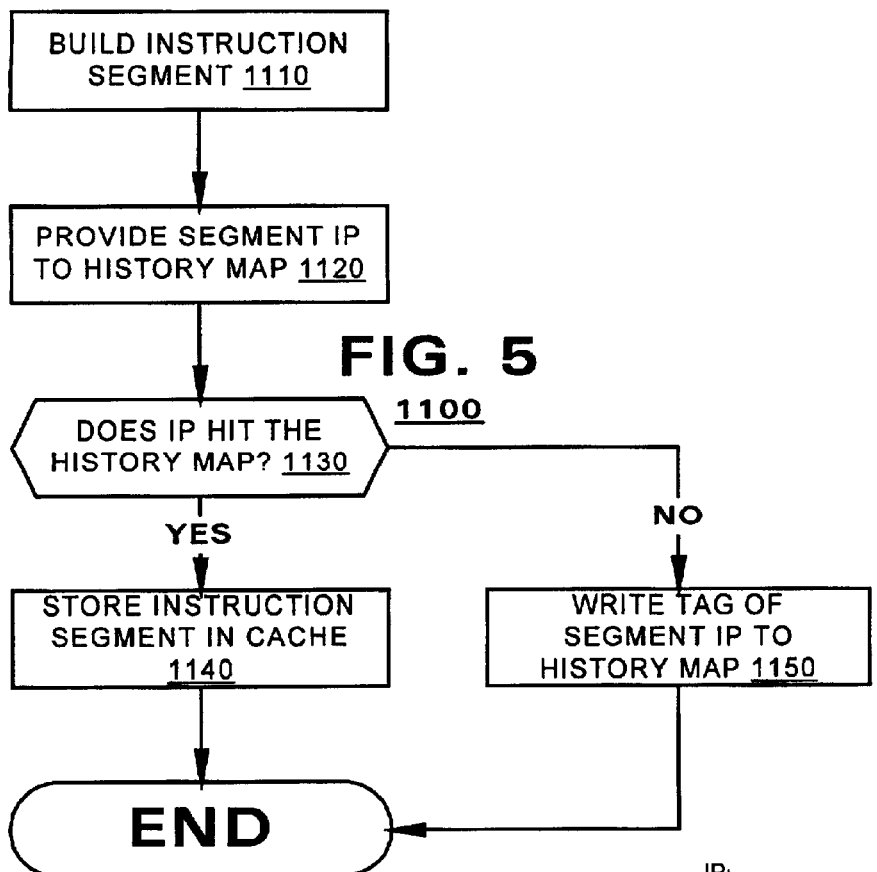
FIG. 5 illustrates an alternate method of operation according to an embodiment of the present invention.

Embodiments of the present invention provide a filtering system for instruction segments. The filtering system may determine whether a new instruction segment satisfies a predetermined filtering condition prior to storage. If the instruction segment fails the filtering condition, the new instruction segment is not stored. Various filtering conditions are available but all filtering conditions test to determine whether it is more likely than not that a new instruction segment will be reused by the execution unit in the future.

FIG. 2 is a block diagram of a front end processing system 200 according to an embodiment of the present invention. The front end 200 may include an instruction cache system ("ICS") 210 and an instruction segment system ("ISS") 220. The ICS 210 may be based on any number of known architectures for front-end systems 200. Typically, they include an instruction memory (or cache) 230, a branch prediction unit ("BPU") 240 and an instruction decoder 250. Program instructions may be stored in the instruction cache 230 and indexed by an instruction pointer. Program instructions also may be stored elsewhere in a computing system, such as in a cache hierarchy 300. Instructions may be retrieved from the instruction cache 230 or other storage, decoded by the instruction decoder 250 and passed to the execution unit (not shown). The BPU 240 may assist in the selection of instructions to be retrieved from the instruction cache 230 for execution. As is known, instructions may be indexed by an address, called an "instruction pointer" or "IP." As part of instruction decoding, the decoder 250 may identify the source location of a decoded instruction, for example whether the instruction was retrieved from the instruction cache 230 or from elsewhere in the cache hierarchy 300.

According to an embodiment, an ISS 220 may include a segment builder 260, a segment branch prediction unit (or "segment BPU") 270 and a segment cache 280. The segment builder 260 may build the instruction segments from instructions output by the decoder 250. The segment cache 280 may store the instruction segments. The segment BPU 270 may predict which instruction segments, if any, are likely to be executed and may cause the segment cache 280 to furnish any predicted segment to the execution unit. The segment BPU 270 may store masks associated with each of the instruction segments stored by the segment cache 280, indexed by the IP of the terminal instruction of the instruction segments.

The ISS 220 may receive decoded instructions from the ICS 210. The ISS 220 also may pass decoded instructions to the execution unit (not shown). A selector 290 may select which front-end source, either the ICS 210 or the ISS 220, will supply instructions to the execution unit. In an embodiment, the segment cache 280 may control the selector 290.

According to an embodiment, a hit/miss indication from the segment cache 280 may control the selector 290.

Of course, the front-end processing system 200 is but a component of a larger processing system. Instructions typically are provided to the front-end processing system 200 from a cache hierarchy 300 that may include one or more layers of caches 310 and a system memory 320. The layers of cache 310 may include internal and/or external caches. Internal caches may be provided as part of the same integrated circuit ("chip") as the front-end system 200; external caches may be provided on a separate chip. These components are shown in FIG. 2 in phantom.

In the system of FIG. 2, the BPU 240 determines which instructions are likely to be required for execution. The BPU 240 interrogates the instruction cache 230 to determine whether the required instruction is present therein. If so, the "request" is said to hit the instruction cache 230. The instruction cache 230 furnishes the required instruction to the decoder 250. If not, if the request "misses" the cache, then the ICS 210 may issue a request to the cache hierarchy for the required instruction. Often, the request propagates through the levels of the cache hierarchy. At each level, a hit/miss determination is made to determine whether the required instruction is present in the respective level. If so, the required instruction is furnished to the ICS 210; if not, the request propagates to a next higher level.

When an instruction is provided to the ICS 210, the instruction may be received both by the instruction cache 230 and by the decoder 250. The decoder 250 may decode the instruction and provide it to the selector 290. The instruction cache 230 may store the instruction. Thus, if the BPU 240 later determines that the instruction is required for execution, the instruction (unless evicted by some other instruction) will be present in the instruction cache 230.

According to an embodiment, the front-end system 200 may integrate a filtering operation to the storage of instruction segments within the segment cache 280. A variety of filter conditions are disclosed herein. FIG. 3 illustrates a basic method of operation 1000 for use with each of the filter conditions. According to the method, the ISS 220 may build the instruction segment according to conventional procedure (box 1010). For example, an extended block may be constructed according to the procedures specified in the foregoing copending application referenced above. When the instruction segment is assembled, the segment builder 260 may determine whether the instruction segment satisfies a predetermined filter condition (box 1020). If so, the instruction segment may be stored in the segment cache (box 1030). The method may conclude after the instruction segment is stored or if the filter conditions are satisfied.

In one embodiment, storage of an instruction segment may be triggered by a source location from which the instructions therein were retrieved. According to this embodiment, the decoder 250 may indicate, for each instruction, whether the decoder 250 retrieved the instruction from the instruction cache 230 or whether the decoder 250 received the instruction from some component of the cache hierarchy 300. For example, the decoder 250 may enable a flag (called a "location flag" herein) for each instruction in its output data stream to indicate that the instruction originated within the instruction cache 230. The location flag may be a simple as a one-bit flag provided in the decoder's output for each instruction. Alternatively, the location flag may be a multi-bit signal to identify, in a multi-level cache system, cache level from which the instruction was retrieved. The segment builder 260 may determine whether to store an instruction segment based on the information content of the location flags provided for each instruction therein.

In one embodiment, shown in FIG. 4, the segment builder 260 may determine that the filtering conditions are met only if every instruction in an instruction segment originated from the instruction cache 230 (FIG. 2). In such an embodiment, it may be appropriate to set the location flag to logical 0 when the instructions originate from the instruction cache 230 and to logical 1 otherwise. Thus, the segment predictor 260 simply may apply a logical OR to the location flags associated with the instruction segment. Thus, FIG. 4 illustrates location flags assembled into a "location field" 410 and applied to an OR gate 420. An output of the OR gate 420 may be used as a write control signal to determine whether the instructions of the new segment, shown in a "data" field 430, would be stored in the segment cache 280 (FIG. 2).

Other alternatives are available. For instance, instead of requiring all instructions to originate from the instruction cache 230 before an instruction segment can be written in the segment cache 280, another embodiment permits an instruction segment to be written to the segment cache 280 if at least one instruction originated from the instruction cache 230. In this embodiment, a logical AND 440 of the location flags 410 may generate a write control signal. This embodiment is shown in FIG. 4 in phantom and may be substituted for the OR gate 420.

In another embodiment, also shown in phantom, the location flags may be summed to determine whether a threshold number of instructions originated within the instruction cache 230. A logical OR 460 of the output from an adder 450 may generate a write control signal to control writing of the instruction segment 430 to the instruction cache 280 (FIG. 2).

In another embodiment, not shown, a segment builder 260 may test the location flag of the instruction on which the instruction segment, if stored, would be indexed. As noted above, extended blocks may be indexed based on the terminal instruction therein. If the terminal instruction originated within the instruction cache 230, it may indicate that program flow is returning to instructions previously cached in the instruction cache. Storage of an instruction segment may be useful for future execution.

Testing the location flags output by the decoder 250 helps to distinguish instruction segments from each other based upon their "closeness" to the core. As is known, many processors include circuitry that tend to "push" instructions to the instruction cache 230 based upon their relevance to execution. Thus, instructions found in the instruction cache 230 may be presumed to be more relevant to program execution than instructions found elsewhere in the cache hierarchy 300. Testing the location flags permits the segment builder 260 to apply this presumption to newly constructed instruction segments.

The embodiments that test the location flags are advantageous also because they provide a segment filtering scheme using a very simple architecture. These embodiments do not require elaborate caches to track and maintain histories of previous activity. Instead, a decoder may be provided with circuitry to generate the location flags as by-product of the decoding operation. Thus, the filtering scheme of the foregoing embodiments may be integrated within known processing systems without adding much in the way of additional circuitry.

The segment builder 260 need not test location flags from the decoder 250 in all embodiments. In another embodiment, the segment BPU 270 may include a memory 275, called a "history map" herein, that stores identifiers of instruction segments that previously had been built by the segment builder 260 but discarded. This history map 275 is shown in phantom in FIG. 2 because it need not be present in those embodiments that test location flags from the decoder 250. The history map 275 may have capacity to track more instruction segments than could be stored in the segment cache 280, for example, twice or three times as many.

FIG. 5 illustrates an alternate method of operation 1100 according to an embodiment of the present invention. Each time an instruction segment is built (box 1110), the IP of the instruction segment may be supplied to the history map 275 (FIG. 2) to determine whether the IP hit the history map 275 (box 1120). The history map 275 may generate a hit/miss response indicating whether the IP hit the history map (box 1130). If a hit is registered, the segment builder 260 may store the new instruction segment in the segment cache 280 (box 1140). If the IP misses the history map, the tag of the IP may be written to the history map (box 1150).

Figure 6:
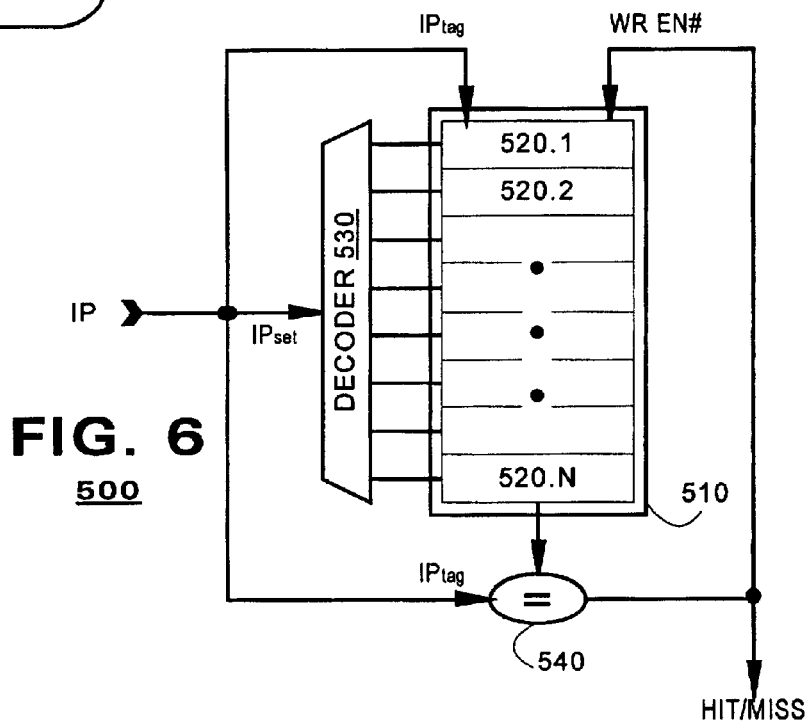
FIG. 6 is a block diagram of a history map 500 according to an embodiment of the present invention.

FIG. 6 is a block diagram of a history map 500 according to an embodiment of the present invention. According to the embodiment, the history map 500 may be a direct-mapped cache. It may include an array 510 of map entries 520.1–520.N, an address decoder 530 and a comparator 540. The address decoder 530 may receive a first portion of an input IP, called the "set" field (represented as $IP_{tag}$), and cause data to be output from one of the entries 520.1–520.N to a first input of the comparator 540. Typically, the set field constitutes a predetermined number of least significant bits of the IP. The remaining most significant bits of the IP, the "tag" ($IP_{tag}$), may be input to a second input of the comparator 540. An output of the comparator 540 may be output from the history map 500 as a hit/miss indicator. The output of the comparator also may be fed back to the array 510 as a write enable control signal, causing the $IP_{tag}$ values to be written into the array 510 in response to a miss.

In an embodiment, the map entries 520.1–520.N may have a width sufficient to store the full width of a tag. The history map 500 may generate hits and misses based on a full tag match, thereby guaranteeing high accuracy. In an alternate embodiment, the map entries 520.1.–520.N may have a width sufficient to store only a portion of the tag data. Hits and misses generated by the history map 500 in this latter embodiment would be generated based on a partial tag match and can be subject to error. For example, in some applications an address tag may be 16 bits in length. In a partial tag embodiment, map entries 520.1–520.N may be only four or five bits wide. Although a partial tag match could lead to "false hits" in this latter embodiment, the embodiment leads to simplified circuitry and consumes less area than the former embodiment when manufactured as an integrated circuit. Accordingly, the performance disadvantages suffered as a result of the false hits may be deemed acceptable in applications where the simplified circuitry and reduced area would be advantageous.

When a new IP is applied to the history map 500 for the first time, the set will cause tag data previously stored in one of the entries 520.1–520.N to be output to the comparator 540 and compared with the $IP_{tag}$ value of the IP. Because it is the first time for the new IP, no match will occur and the history map 500 will output a miss signal to the segment builder 260 (FIG. 2). The $IP_{tag}$ value also will be written to the array, overwriting the entry (say, 520.2) from which data was read. When the IP is applied to the history map 500 for the second time, assuming the same entry 520.2 was not overwritten with other data, the comparator 540 will indicate a hit to the segment builder 260.

The foregoing embodiment of the history map 500, of course, does not maintain an infinite memory. When misses occur, new IP values may evict older IP values within the array 510. Thus, it is possible that the same instruction segment will be built twice and discarded both times during operation. But, when the array 510 is provided with a capacity sufficient to track twice or three times as many instruction segments as can be stored in the segment cache 280 (FIG. 2), it is beneficial for the thrashing to occur in the history map 500 rather than in the segment cache 280. Doing so prolongs the useful life of those instruction segments that already are stored in the segment cache 280.

In another embodiment, the history map 500 may be implemented as a set-associative memory, with two or more arrays 510 provided as ways. In this alternate embodiment, a state machine (not shown) may manage data eviction from the multiple arrays 510 according to a round-robin or least recently used eviction policy.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. An instruction segment storing method, comprising:
   building an instruction segment, according to program flow,
   determining whether the instruction segment satisfies a filtering condition based on source locations of instructions within the instruction segement, and
   if the instruction segment satisfies the filtering condition, storing the instruction segment in a segment cache.

2. The method of claim 1, wherein the filtering condition met if all instructions in the instruction segment were assembled into the instruction segment from an instruction cache of a front-end processing system in a processor.

3. The method of claim 1, wherein the filtering condition is met if at least one instruction in the instruction segment was assembled into the instruction segment from an instruction cache of a front-end processing system in a processor.

4. The method of claim 1, wherein the filtering condition is met if a predetermined number of instructions in the instruction segment assembled into the instruction segment from an instruction cache of a front-end processing system in a processor.

5. The method of claim 1, wherein the filtering condition is met if an instruction of the segment by which the segment is to be indexed was assembled into the instruction segment from an instruction cache of a front-end processing system in a processor.

6. An instruction segment storing method, comprising:
building an instruction segment according to program flow from fetched instructions,
determining, from flags identifying locations from which the instructions in the instruction segment were fetched, whether the instruction segment satisfies a filtering condition, and
if so, storing the instruction segment in a segment cache.

7. The method of claim 6, wherein the filtering condition is met if all instructions in the instruction segment were assembled into the instruction segment from an instruction cache of a front-end processing system in a processor.

8. The method of claim 6, wherein the filtering condition is met if at least one instruction in the instruction segment was assembled into the instruction segment from an instruction cache of a front-end processing system in a processor.

9. The method of claim 6, wherein the filtering condition is met if a predetermined number of instructions in the instruction segment were assembled into the instruction segment from an instruction cache of a front-end processing system in a processor.

10. The method of claim 6, wherein the filtering condition is met if an instruction of the segment by which the segment is to be indexed was assembled into the instruction segment from an instruction cache of a front-end processing system in a processor.

11. A front end system for a processing agent, comprising:
an instruction cache system, and
an instruction segment system, comprising:
a segment cache, and
a segment builder provided in communication with the instruction cache system, to store a new instruction segment in the segment cache after the instruction segment has been built according to program flow a predetermined plural number of times.

12. The front end system of claim 11, further comprising a history map provided in communication with the segment builder to identify instruction segments that have been built previously but were discarded.

13. The front end system of claim 12, wherein the history map is a direct mapped cache.

14. The front end system of claim 12, wherein the history map is a set associative cache.

15. The front end system of claim 14, wherein the history map comprises a plurality of cache entries having a width corresponding to a width of a tag address of an instruction pointer in the system.

16. The front end system of claim 14, wherein the history map comprises a plurality of cache entries having a width corresponding to a width of a portion of a tag address of an instruction pointer in the system.

17. A processing agent, comprising:
a cache hierarchy, and
a front end system comprising:
an instruction cache system in communication with the cache hierarchy, and
an instruction segment system, comprising:
a segment cache, and
a segment builder provided in communication with the instruction cache system, to store a new instruction segment in the segment cache after the instruction segment has been built according to program flow a predetermined plural number of times.

18. The processing agent of claim 17, further comprising a history map provided in communication with the segment builder to identify instruction segments that have been built previously but were discarded.

19. A computer system, comprising the processing agent of claim 17, wherein the cache hierarchy includes an internal cache and a system memory.

20. A computer system, comprising the processing agent of claim 17, wherein the cache hierarchy includes an internal cache and an external cache.

21. A method, comprising:
building an instruction segment, according to program flow
determining whether the instruction segment satisfies a filtering condition based on source locations of instructions within the instruction segment, and
storing the instruction segment in a segment cache unless the instruction segment does not satisfy the filtering condition.

22. The method of claim 21, wherein the determining comprises determining whether all instructions in the instruction segment were assembled into the instruction segment from an instruction cache of a front-end processing system in a processor.

23. The method of claim 21, wherein the determining comprises determining whether at least one instruction in the instruction segment assembled into the instruction segment from an instruction cache of a front-end processing system in a processor.

24. The method of claim 21, wherein the determining comprises determining whether a predetermined number of instructions in the instruction segment assembled into the instruction segment from an instruction cache of a front-end processing system in a processor.

25. The method of claim 21, wherein the determining comprises determining whether an instruction of the segment by which the segment is to be indexed was assembled into the instruction segment from an instruction cache of a front-end processing system in a processor.

26. The method of claim 21, wherein the determining comprises comparing location flags identifying locations from which instructions within the segment were retrieved to a predetermined filtering condition.

27. A front end system for a processing agent, comprising:
an instruction cache system, and
an instruction segment system, comprising:
a segment builder to build instruction segments according to program flow from instructions retrieved from the instruction cache.
a segment cache to store instruction segments after the respective instruction segments have been built at least twice.

28. The front end system of claim 27, further comprising a history map provided in communication with the segment builder to identify instruction segments that have been built but not stored in the segment cache.

29. The front end system of claim 28, wherein the history map is a direct mapped cache.

30. The front end system of claim 28, wherein the history map is a set associative cache.

31. The front end system of claim 30, wherein the history map comprises a plurality of cache entries having a width corresponding to a width of a tag address of an instruction pointer in the system.

32. The front end system of claim 30, wherein the history map comprises a plurality of cache entries having a width corresponding to a width of a portion of a tag address of an instruction pointer in the system.

33. An instruction segment storing method, comprising:
   building instruction segments as instructions are executed,
   determining whether a new instruction segment has been built multiple times, and
   if so, storing the new instruction segment in a segment cache,
   otherwise, discarding the new instruction segment.

34. The method of claim 33, further comprising storing identifiers of discarded instruction segments for comparison against identifiers of newly built instruction segments.

35. The method of claim 33, wherein the instruction segment is a basic block.

36. The method of claim 33, wherein the instruction segment is a trace and is indexed within the segment cache by a first instruction therein.

37. The method of claim 33, wherein the instruction segment is an extended block and is indexed within the segment cache by a last instruction therein.

* * * * *